US006537939B1

United States Patent
Harvey (10) Patent No.: US 6,537,939 B1
(45) Date of Patent: Mar. 25, 2003

(54) POROUS GROG COMPOSITION, WATER PURIFICATION DEVICE CONTAINING THE POROUS GROG AND METHOD FOR MAKING SAME

(76) Inventor: Anthony Reid Harvey, c/o Catherine Nash, World Food Programme, GPO Box 2488, Dhaka-1000 (BD)

(*) Notice: Subject to any disclaimer, the term of this patent is extended or adjusted under 35 U.S.C. 154(b) by 20 days.

(21) Appl. No.: 09/692,203

(22) Filed: Oct. 20, 2000

(51) Int. Cl.$^7$ .............................................. C04B 33/22
(52) U.S. Cl. ............................ 501/81; 501/83; 501/141
(58) Field of Search ........................... 501/81, 83, 141

(56) References Cited

U.S. PATENT DOCUMENTS

| 1,988,246 A | | 1/1935 | Krause | |
|---|---|---|---|---|
| 3,878,104 A | | 4/1975 | Guerrero | |
| 3,886,244 A | * | 5/1975 | Bayer et al. | 264/44 |
| 3,939,079 A | | 2/1976 | Uchiyama et al. | |
| 4,438,055 A | * | 3/1984 | Van der Velden | 264/44 |
| 4,780,433 A | | 10/1988 | Keller | |
| 4,900,698 A | | 2/1990 | Lundsager | |
| 5,151,122 A | | 9/1992 | Atsumi et al. | |
| 5,183,787 A | * | 2/1993 | Seaborne | 501/143 |
| 5,229,013 A | * | 7/1993 | Regutti | 210/778 |
| 5,543,056 A | | 8/1996 | Murcott et al. | |
| 5,618,782 A | | 4/1997 | Shirakawa et al. | |
| 6,042,763 A | * | 3/2000 | Kumaoka | 264/44 |

FOREIGN PATENT DOCUMENTS

| CN | 1037465 | * | 11/1989 |
|---|---|---|---|
| CN | 1186712 | * | 7/1998 |
| JP | 02071811 | * | 3/1990 |
| JP | 03161408 | * | 7/1991 |
| JP | 06305851 | * | 11/1994 |
| JP | 10085590 | * | 4/1998 |
| KR | 9501397 | * | 2/1995 |

OTHER PUBLICATIONS

MIT Video, "The Nepal Water Project", 2 pages, printed offline Feb. 14, 2002, (http://caes.mit.edu/mvp/html/nepal.html)

Department of Civil & Environmental Engineering, "Thesis Abstracts" Environmental Fluid Mechanics and Coastal Engineering, 64 pages, printed offline Feb. 14, 2002 (http://web.mit.edu/civenv/html/research/abstracts/coast.html).

"A–7 Three Kalshi", 3 pages, printed offline Feb. 14, 2002, MIT (Author Unknown) (http://web.mit.edu/shaheer/www/arsenic/templates/A7Kalshi.htm).

"A1—AquaBind™ Arsenic XP using Activated Alumina Metal Oxide", 3 pages, Author Unknown (http://web.mit.edu/shaheer/www/arsenic/templates/A1Apyron..htm) (No Date Available).

Krause, G.A., "Oligodynamic Water Purification by Means of Catalytic Silver", *Gesundheits–Ingenieur*, vol. 52, pp 500–505, 1929.

* cited by examiner

*Primary Examiner*—Paul Marcantoni
(74) *Attorney, Agent, or Firm*—Hunton & Williams

(57) ABSTRACT

A porous grog with a body composition of water, clay and combustible material. Further, an earthenware water purification filter utilizing the porous grog in the body composition of the filter. A water purification system incorporating said filter, said water purification system capable of removing about 99% of all particles not less than 1.0 micron is size.

11 Claims, 12 Drawing Sheets

POROUS GROG COMPOSITION, WATER PURIFICATION DEVICE CONTAINING THE POROUS GROG AND METHOD FOR MAKING SAME

FIELD OF THE INVENTION

The present invention relates to a novel porous grog composition. Further, the present invention relates to a water purification filter and water purification device employing the novel porous grog composition. Additionally, the present invention relates to a method of making the novel porous grog composition and a method for employing the same in a water purification filter and water purification device.

BACKGROUND OF INVENTION

Due to worldwide growth in population and industrialization, along with natural disasters, world supplies of safe drinking water are dwindling. Key pollutants that pose a threat to humans via polluted water consumption are pathogens (bacteria and viruses) and organics. Additionally, water resources may contain suspended material, dissolved solids, bacteriological contaminants, and biological contaminants. Conventional water filters are commonly used in American households to remove water impurities and provide cleaner, more aesthetically pleasing drinking water. However, there are many disadvantages that make these filters difficult to use, especially in developing countries. Typically, such filters are expensive, bulky, difficult to install and replace, and cumbersome to use. Further, most filters available in the United States are not designed to remove pathogens because it is assumed that the water is pathogen free. With regard to available earthenware, most earthenware products are not porous enough to be adequately permeable to water or, if they are permeable, the water flow rate through them is too small to make them practical as water filters.

A number of ceramic water filters are known in the art. These filters typically are composed of clay and sawdust (which is thought by some to turn into charcoal when fired). For example, in the early 1980s, Fernando Mazareigos developed a porous clay filter for the Central American Research Institute for Industry (ICAITI). Since its development, this filter has been introduced and promoted in Central and South America. The body composition of Mazareigos' filter is 50% dry clay and 50% dry sawdust, by volume, of between 35 mesh and 60 mesh.

The ceramic water filters known in the art do not make use of porous grog. As such, they have a disadvantage of having a lower permeability. A further disadvantage of filters known in the art is that, in order to achieve an appropriate flow rate, their lower permeability requires that their size be larger. Larger filters have a disadvantage of being more susceptible to breakage which makes shipping from an efficient central production facility difficult and often requires that such filters be created at the site of intended use.

As such, there exists a need for a method of filtration which is inexpensive, relatively simple to manufacture, utilizes readily available components and, yet, still provides adequate water filtration. There also exists among earthenware products a distinct need for a composition which can provide the earthenware with an increased permeability and thereby allow smaller, less breakable filters with appropriate flow rates.

SUMMARY OF THE INVENTION

The present invention addresses the difficulties and problems discussed supra by providing for a composition of, and method for making, a porous grog (i.e., a very porous, pre-fired clay material). The porous grog of the present invention may be used to increase the permeability of earthenware. According to the present invention, the porous grog has a body composition of water, clay and combustible material. The clay may be selected from any fine-grained, firm earth material that is plastic when wet and hardens when heated. The combustible material is selected from any material which burns off during firing to create voids in the fired clay.

The resultant pressed body is then fired until the body matures into earthenware or until the pressed body can no longer be readily broken down by water. The earthenware is then crushed to yield granules of porous grog. The voids created during the burning off of the combustible material provide the porous grog with its unique permeability.

The present invention also addresses the difficulties and problems discussed supra by providing for a water purification filter employing the porous grog and a method for making same. The water purification filter is inexpensive and relatively simple to produce. Additionally, the water purification filter utilizes material components which are commonly and widely available. Further, it has been found through testing that the water purification filter of the present invention is capable of removing about 99% of particles of all sizes down to about 1.0 micron.

The water purification filter has a body composition of water, clay, porous grog and combustible material. The body is allowed to dry to a relatively low moisture content before it is pressed within a set of dies, which resemble a mold. The resultant pressed body is then fired until the body matures into earthenware or until the pressed body can no longer be readily broken down by water. Following firing, silver may be applied to the water purification filter. The present invention further provides for a water purification system employing the water purification filter.

DETAILED DESCRIPTION OF THE INVENTION

The present invention relates to a composition for a porous grog (i.e., a very porous, pre-fired clay material). The body composition of the porous grog is a mixture of water, clay and combustible material. The body is fired and the firing causes the combustible material to burn off resulting in a porous earthenware. The porous earthenware may then be crushed to form the porous grog.

Clay, as used in this invention, means any fine-grained, firm earth material that is plastic when wet and hardens when heated. The clay utilized by the present invention is plastic and moldable when mixed with water, retains its shape on drying, and becomes permanently hard on heating or firing. Two nonlimiting examples are white clay and clays that fire reddish. Clays that fire reddish can be found almost anywhere in the world, thus making them a convenient and practical source of clay. Therefore, in an embodiment of the present invention, clays that fire reddish are utilized as the clay in the body composition. Preferably, the clay has a mesh size (i.e., number of holes per linear inch of a sieve screen) of at least about 10 mesh. More preferably, the clay has a mesh size of at least about 30 mesh.

The combustible material may be any material which burns off during firing to create voids in the earthenware and provide the earthenware with its porosity. Organic materials of plant or animal origin have been found to have properties which provide suitable burn off during firing. In particular, grain flour is a preferred combustible material. Wheat flour is widely prevalent as an inexpensive resource. Thus, in an embodiment of the present invention, wheat flour is used as the combustible material. Preferably, the combustible material has a mesh size from about 100 mesh to about 650 mesh. More preferably, the combustible material has a mesh size from about 250 mesh to about 450 mesh. Most preferably, the combustible material has a mesh size of about 350 mesh.

The amount of water, clay and combustible material utilized in the mixture will vary depending upon the amount of porous grog sought and the desired permeability of the porous grog. Generally, in a preferred embodiment, the amount of clay added to the mixture is about 40% to about 80% by weight and the amount of combustible material utilized is about 20% to about 60% by weight. In a more preferred embodiment, the amount of clay added to the mixture is about 50% to about 70% by weight and the amount of combustible material utilized is about 30% to about 50% by weight. In a further preferred embodiment, the amount of clay is about 60% by weight and the amount of combustible material is about 40% by weight. In a most preferred embodiment, the amount of clay is about 63% by weight and the amount of combustible material is about 37% by weight. The amount of water utilized is at least the amount necessary to sufficiently allow a uniform mixing of the clay and combustible material. However, not so much water should be added that the mixture must be allowed to have an unreasonable drying time before it can be pressed.

In a preferred method of mixing together the clay and combustible material, water is first mixed with the clay. In an embodiment of the present invention, the clay and water combination is then allowed to stand for about zero to about six hours to permit the combination to become sufficiently plastic. In a preferred embodiment, the clay and water combination is allowed to stand for about 1.5 hours to about 4.5 hours. In a more preferred embodiment, the clay and water combination is allowed to stand for about three hours. When the clay and water combination is considered to be sufficiently plastic, the combustible material is mixed into the clay and water combination. Mixing alternated with size reduction by breaking the larger particles is helpful to ensure uniform distribution of the combustible material throughout the clay and water mixture. Following mixing, the mixture may be spread out to dry until it has the correct moisture content for pressing. In a preferred embodiment of the present invention, the mixture may be pressed into a form or forms conducive to efficient firing. For example, in one preferred method, the mixture is spread out and allowed to dry until the moisture content of the mixture is less than about 15% by weight. In a more preferred method, the mixture is spread out and allowed to dry until the moisture content of the mixture is about 8–10% by weight. The mixture is then dry pressed into forms or shapes which are conducive to efficient firing. In a preferred embodiment, the dried mixture is pressed into a cylindrical mold, released from the mold and then fired. It has been found through experimentation that disk shapes facilitate stacking in a kiln and allow uniform exposure to heat.

After the body composition of water, clay and combustible material has been properly mixed but prior to firing of the body or disks, it may be necessary for the body or disks to be allowed to dry to a moisture content appropriate for firing. Preferably, the body or disks are allowed to dry for about zero to about four days. More preferably, the body or disks are allowed to dry for about two days.

Firing is a technique and procedure well known to those skilled in the art. For example, the body may be fired in a kiln or other similar pottery oven. Kilns and firing technology are well known to those of skill in the art and are well described in literature such as *The Kiln Book, Materials, Specifications and Construction*, by Frederick Olsen (Chilton Book Co., second edition, 1983).

Firing begins slowly at a preliminary firing temperature. The preliminary firing temperature is a temperature at least great enough to burn off the combustible material but not so great as to cause the body or disks to bloat and/or break The bloating or breakage which occurs at firing temperatures above the preliminary firing temperature inhibits the unique porosity characteristics exhibited in the resultant fired porous grog of the present invention and is in contrast to the objects of the present invention. After the combustible material has burned off, the firing may continue at a temperature higher than the preliminary firing temperature.

Firing continues until the body matures into earthenware or until the body can no longer be broken down by water. Maturing temperatures and times typically depend upon the properties of the specific kiln, pottery oven or firing device used. However, such properties are usually easily ascertainable by a user and determining the maturing temperature and time particular to a specific firing device does not require undue experimentation by one skilled in the art. Generally, a sufficient temperature is at least about 500° C. and the body will be fired for at least about three hours. For example, a standard cylindrical red brick kiln is described in *An Improved Bonfire Kiln*, by the Organization Intermediate Technology of Kenya. Using such a kiln, the mixture should mature into earthenware after about four to six hours of firing at temperatures up to about 700° C. Following firing, the earthenware is crushed to create granules of porous grog. As the combustible material has been burned off during the firing, the granules of porous grog will contain voids, spaces or air pockets.

The present invention further relates to a water purification filter that can be made using the porous grog. The unique permeability characteristics of the porous grog provide the filter with a greater flow rate than other known earthenware filters while still maintaining a pore size small enough to remove about 99% of particles of all sizes down to about 1.0 micron. One reason that the porous grog improves the permeability is that the clay material of the present invention is generally "dry pressed" (i.e., pressed with a relatively low water content). Because the clay material has a low water content, the particles are pushed apart by a kind of friction. By contrast, the clays that are popularly used for throwing and handbuilding ceramics are moist clays of around 30% water content. For these moist clays, the particles are pulled together more tightly and the water flow rate through the fired clay material is thereby inhibited.

To produce the water purification filter, porous grog is mixed with water, clay and combustible material. This mixture is pressed in a set of dies, removed and fired to create an earthenware water purification filter. In a preferred embodiment, upon removal from the mold, the water purification filter is cleaned of any seams resulting from the set of dies and may also be burnished (i.e., the surface of the filter may be smoothed by rubbing with a hard object to give a finish with a smooth effect). It has been found through experimentation that burnishing the filter improves the strength of the filter.

As with the body composition of the porous grog, the clay of the water purification filter may be any fine-grained, firm earth material that is plastic when wet and hardens when heated. Additionally, as in the clay of the body composition of the porous grog, the clay utilized in the filter is plastic and moldable when mixed with water, retains its shape on drying, and becomes permanently hard on heating or firing. The clay utilized to make the water purification filter may be of the same type and size as that used in the porous grog. However, the clay utilized in the body composition of the water purification filter does not necessarily have to be of the same type and size as that used in the porous grog. In a preferred embodiment, clays that fire reddish are utilized in the body composition of the water purification filter.

As with the body composition of the porous grog, the combustible material may be any material which burns off during the firing of the filter leaving a plurality of spaces, voids or air pockets. The combustible material utilized to make the water purification filter may be of the same type and size as that used in the porous grog. However, the combustible material utilized in the body composition of the water purification filter does not necessarily have to be of the same type and size as that used in the porous grog. In a preferred embodiment, the combustible material is of plant or animal origin. In a further preferred embodiment, the combustible material is grain flour. Wheat flour is available almost everywhere in the world. In addition, wheat flour has proven effective in achieving a good flow rate. Thus, in an even further preferred embodiment, the combustible material is wheat flour.

The composition ratios of the clay, porous grog and combustible material will vary depending upon the resultant filter permeability desired. In a preferred embodiment, the composition contains between about 30% and about 60% by weight of clay, between about 30% and about 60% by weight of porous grog and between about 5% and about 20% by weight of combustible material. In a more preferred embodiment, the composition contains about 45% by weight of clay, about 45% by weight of porous grog and about 10% by weight of combustible material.

The mesh size of the composition components may be varied depending on the pore sizes of the clay, porous grog and combustible material. Further, the mesh size utilized will be dependent upon the desired resultant permeability of the water purification filter. In a preferred embodiment, the mesh size of the clay is at least about 20 mesh. In a more preferred embodiment, the mesh size of the clay is at least about 30 mesh.

Preferably, the combustible material should be of a very fine grain so that the combustible material will burn off during firing and leave a plurality of voids which improve the permeability of the filter. In a preferred embodiment, the combustible material is from about 100 mesh to about 650 mesh. In a more preferred embodiment, the combustible material is from about 250 mesh to about 450 mesh. In an even more preferred embodiment, the mesh size of the combustible material is about 350 mesh.

Preferably, the percentage by weight of water added is that amount sufficient to facilitate the uniform mixing of the clay, porous grog and combustible material. In a preferred method, the mixture, following mixing, should be allowed to dry to a water content of about 15% or less by weight before the mixture is pressed. In a more preferred method, the mixture, following mixing, should be allowed to dry to a water content of about 8–10% by weight before the mixture is pressed. This "dry press" material of a body containing a relatively low water content by weight is in contrast to the conventional moist clay of a body containing about 30% water content by weight and is a factor in the increased permeability of the water purification filter. Preferably, following removal from the set of dies and any optional cleaning or burnishing, the filter is allowed to dry before firing. More preferably, the amount of water added to the mixture prior to pressing is such that, following removal from the set of dies, the filter requires not more than about four days to dry before it is ready for firing.

Firing of earthenware is a process and technique that is well known to those skilled in the art. Though not required, the filter may be fired using the same procedures, temperatures, firing devices, and time periods as those previously described for the firing of the porous grog. In a preferred method of firing, the temperature is sufficiently high to cause the combustible material to burn off and mature the filter body into earthenware or until the material can no longer be readily broken down by water. Preferably, the firing is at a temperature of at least about 500° C. More preferably, the firing is at a temperature of about 600° C. Even more preferably, the firing is at a temperature of about 700° C. Most preferably, the firing is at a temperature of about 950° C. to about 1100° C. Generally, in a preferred embodiment, the firing will last for at least about three hours.

A small amount of silver material may be applied to the earthenware following firing. This silver material causes an oligodynamic action whereby micro-organisms are starved of oxygen and are disabled when they make contact with silver particles. The silver material also has an electric charge which can cause the internal protoplasts of pathogens to collapse. Further, colloidal silver can render pathogens unable to reproduce and can kill parasites while in their egg stage. Thus, silver material, when applied to the water purification filter, acts as a disinfectant in addition to preventing regrowth of bacteria within the purifier wall. The silver material may be applied in its colloidal form or as silver nitrate. When silver nitrate is applied, the filter should be fired for a second time and a combustible should be closed into the kiln with the filter. This results in a reduction atmosphere, which causes the nitrates to burn off. When colloidal silver is applied, there is not a need for a second firing. Through experimentation it has been found that amounts as low as 0.32% silver solution aid effectiveness in providing potable water. Membrane filtration testing for bacteria has shown that the earthenware filter of the present invention when combined with silver material yields purified water with no visible petri dish bacteria. By contrast, the earthenware filter of the present invention without silver material yields purified water with 20 petri dish bacterial colonies. Membrane filtration testing of the unpurified water used in the earthenware filter tests indicates an uncountable number of petri dish bacterial colonies.

Figure 1:
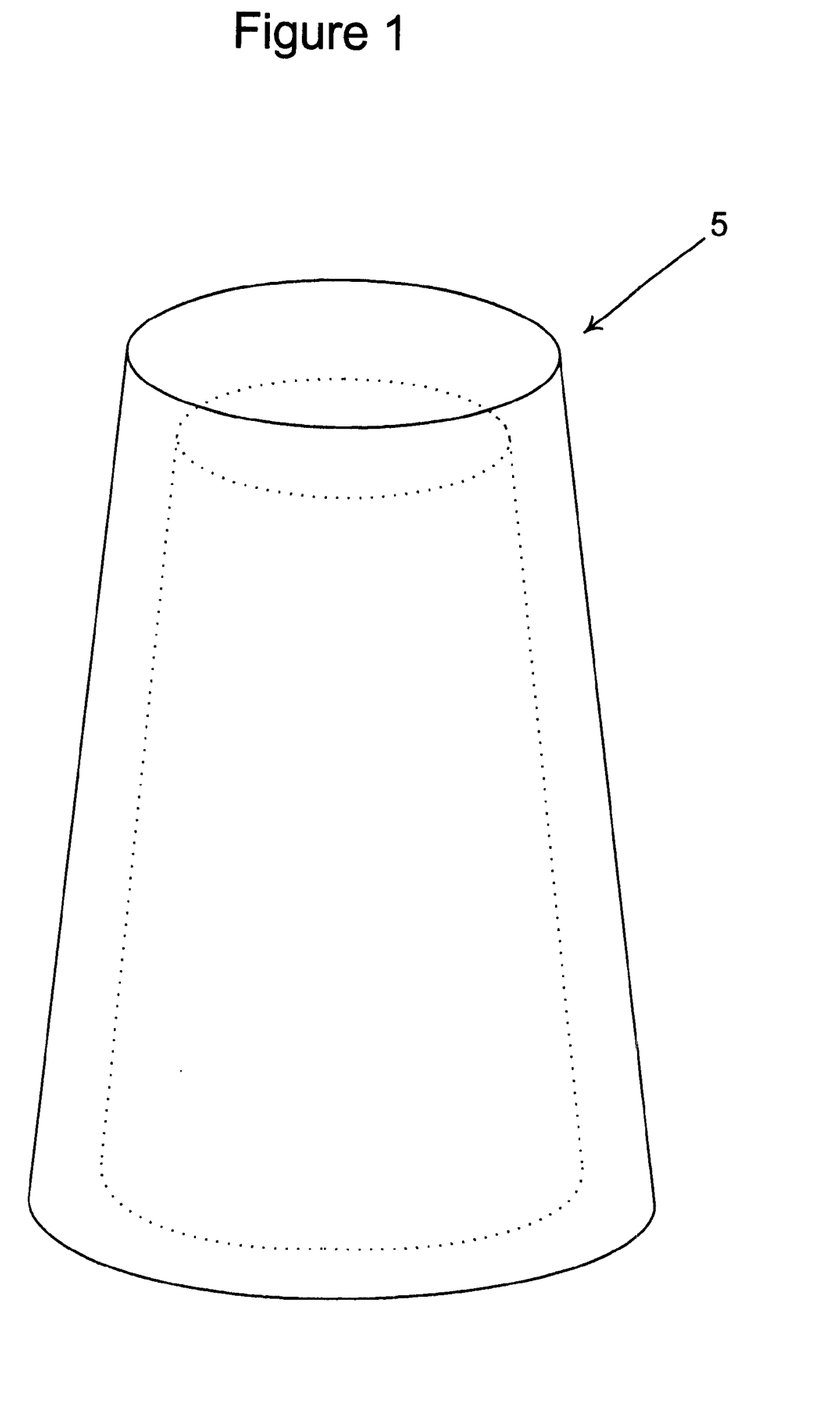
FIG. 1 is a perspective view of an exemplary liquid purification filter embodying the porous grog of the present invention.
Figure 2:
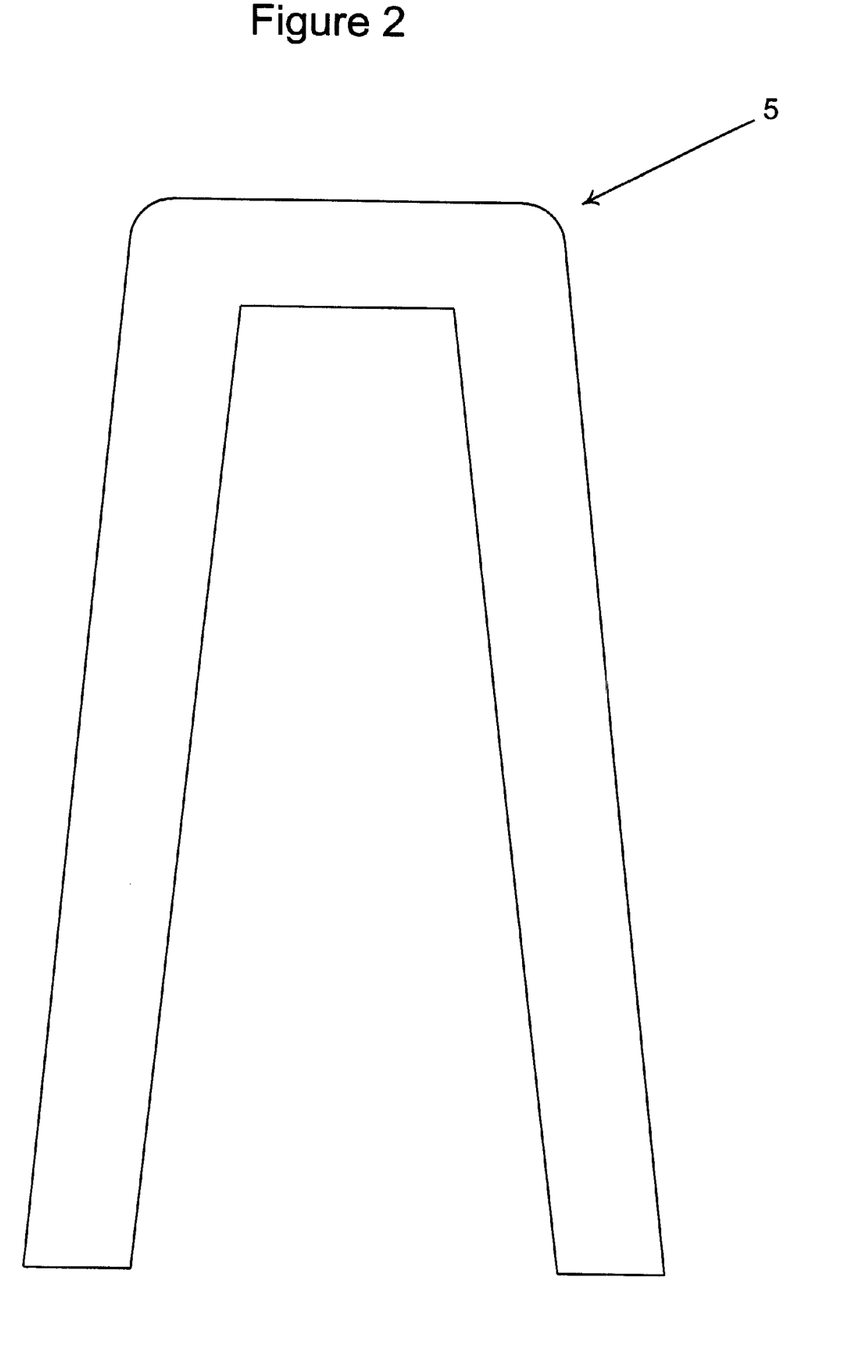
FIG. 2 is a cross-sectional side view of the liquid purification filter of FIG. 1.

Referring to the drawings, FIG. 1 shows a perspective view of a preferred shape for the water purification filter 5. FIG. 2 illustrates a cross-sectional side view of the preferred shape for the filter 5. Methods of creating a mold and die set which can press the body into the preferred shape illustrated in FIG. 1 and FIG. 2 are well known in the art.

Figure 3:
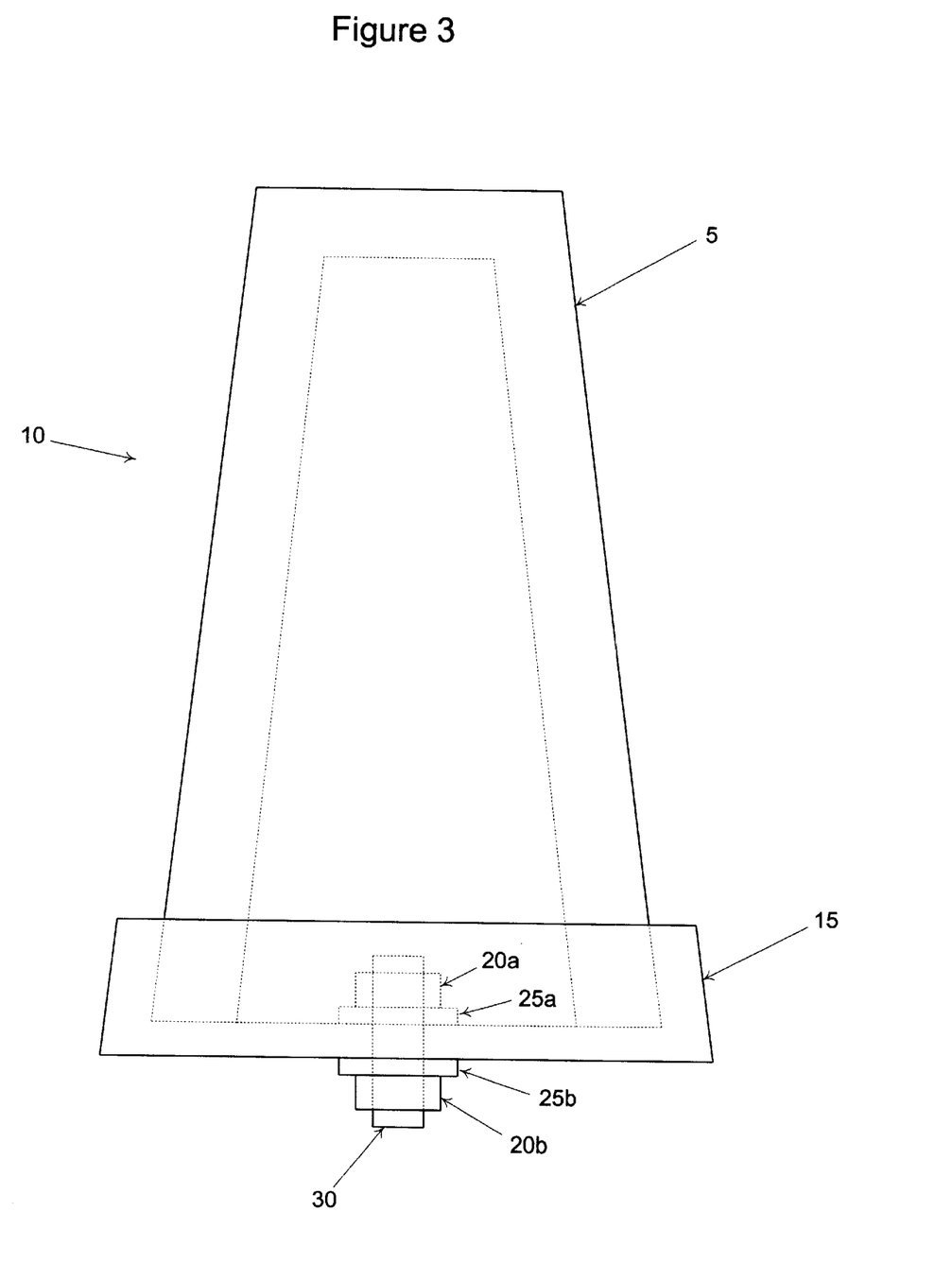
FIG. 3 is a cross-sectional side view of an exemplary liquid purification device incorporating the liquid purification filter of FIG. 1 and FIG. 2.

FIG. 3 illustrates a cross-sectional side view of a preferred embodiment in which the water purification filter 5, illustrated in FIG. 1 and FIG. 2, may be utilized in a water purifier 10. The filter 5 is attached to a cap 15. The filter 5 may be attached to the cap 15 using any suitable connection means known in the art. In a preferred embodiment, the filter 5 is attached to the cap 15 using a small amount of silicone sealant. In another preferred embodiment, the filter 5 is attached to the cap 15 using a wax sealant. In another preferred embodiment, the filter 5 is attached to the cap 15 using a gum sealant. In a further embodiment, the filter 5 is attached to the cap 15 using attachment straps or bolts which secure the filter 5 to the cap 15. The perimeter of the cap 15 should be sealed so that nonpurified water cannot circumvent the filter 5 and enter at the perimeter of the cap 15. The cap 15 may be made of any non-toxic material. In a preferred embodiment, the cap 15 is made of non-toxic plastic. In another preferred embodiment, the cap 15 is earthenware. In a preferred embodiment, the interior cavity formed by the filter 5 and the cap 15 may be filled with powdered porous grog. In this embodiment, the powdered porous grog may be coated with silver material. This silver material may be applied in its colloidal form or as silver nitrate.

The cap 15 has a hole of sufficient diameter for the insertion of a tube 30. The tube 30 may be sealed and attached to the cap 15 by any appropriate means known in the art. The tube 30 may be composed of any material which is non-toxic. In an embodiment of the present invention, the tube 30 is composed of iron or brass and has external threads. As illustrated in FIG. 3, the tube 30 is sealed to the cap 15 with washer 25a on the interior side of the cap 15 and washer 25b on the exterior side of the cap 15. Washer 25a and washer 25b are secured against the interior and exterior sides of the cap 15 by nut 20a and nut 20b. In an embodiment of the present invention, nut 20a and nut 20b fit on the external threads of tube 30 and tighten washer 25a and washer 25b against the cap 15.

Figure 4:
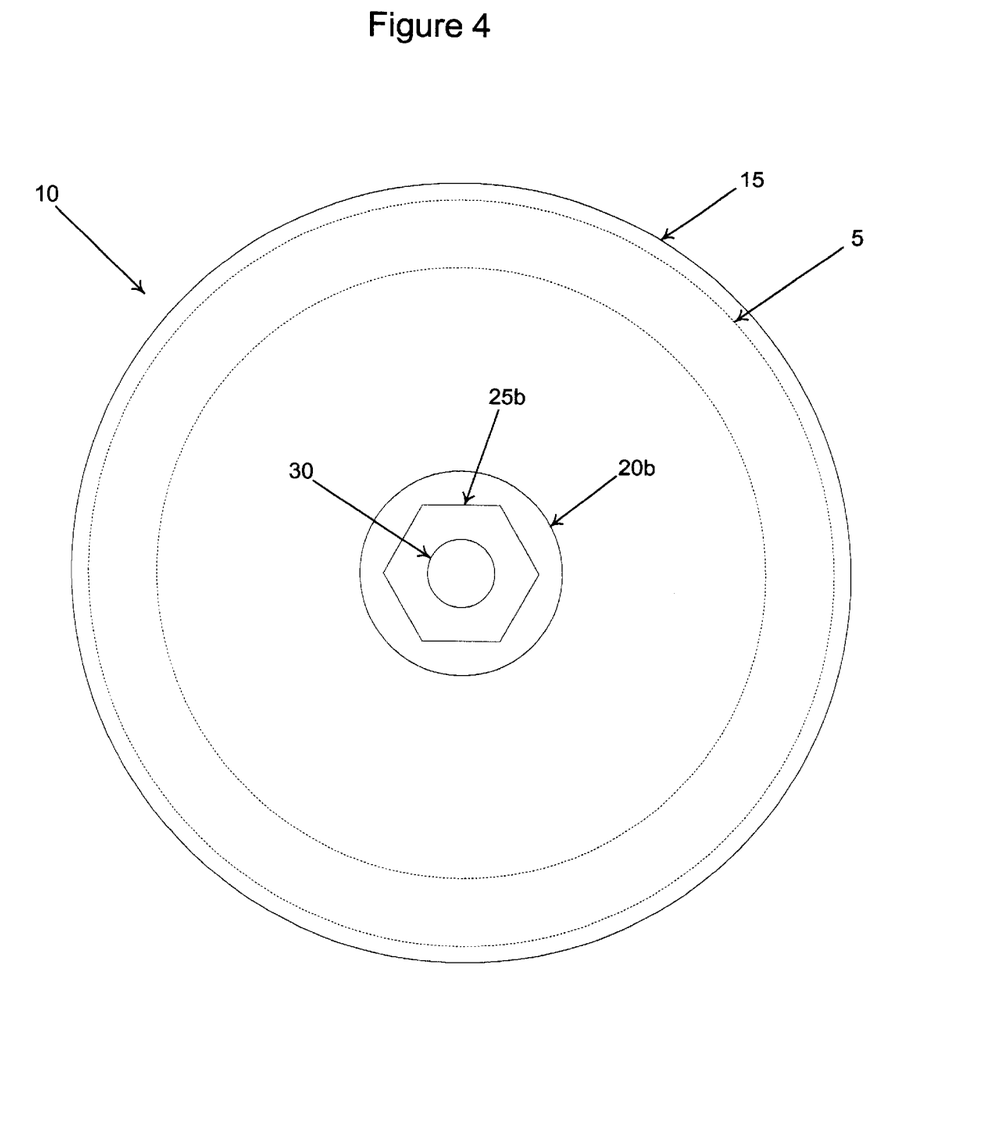
FIG. 4 is a cross-sectional bottom view of the liquid purification device of FIG. 3.

FIG. 4 illustrates a cross-sectional bottom view of the water purification filter 5 being utilized in the water purifier 10 of FIG. 3. The cap 15 is shown attached to the filter 5. The tube 30 is inserted through the cap 15. The tube 30 is sealed to the exterior side of the cap 15 by washer 25b. Washer 25b is tightened against the exterior of the cap 15 by nut 20b.

Figure 5:
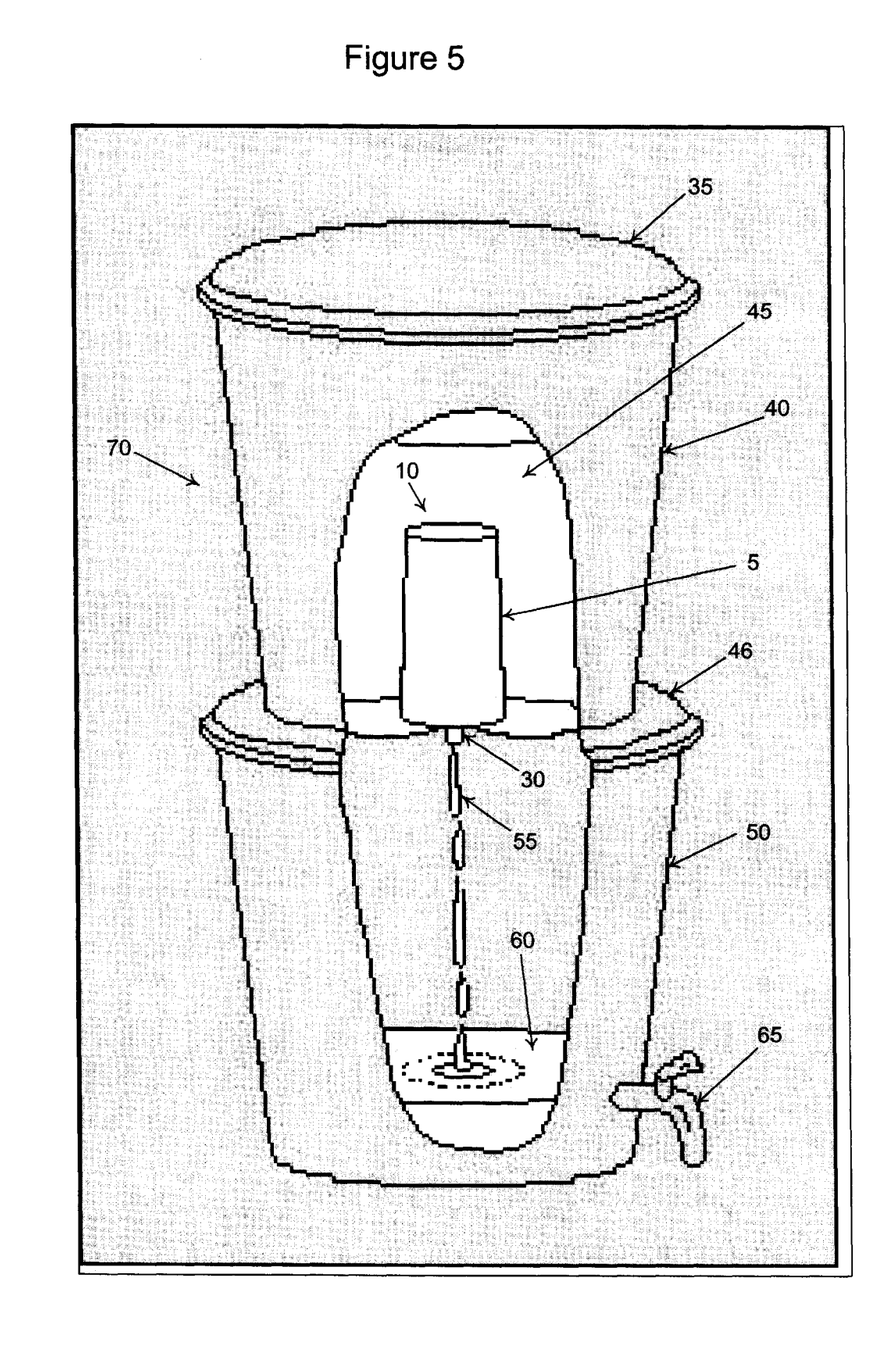
FIG. 5 is a perspective view, with portions in section, of an exemplary liquid purification system incorporating the liquid purification device of FIG. 3 and FIG. 4.

FIG. 5 illustrates a perspective view, with portions in section, of a water purifier system 70 utilizing the water purifier 10 of FIG. 3 and FIG. 4. The purifier 10 is contained in an upper reservoir 40. The upper reservoir 40 may be covered with an upper lid 35 to protect against evaporation, the elements and debris. The upper reservoir 40 has a hole of sufficient diameter to allow the insertion of the tube 30. The tube 30 is inserted through a hole in a lower lid 46 and passes into a lower reservoir 50. In this embodiment, the lower reservoir 50 has a pour spout 65.

Nonpurified water 45 is placed in the upper reservoir 40. The nonpurified water permeates through the filter 5 of the purifier 10 and exits the tube 30 as exit liquid 55. The exit liquid 55 falls into the purified liquid 60 which is contained by the lower reservoir 50. The pour spout 65 may be used to release the purified liquid 60.

In a preferred embodiment, the purifier system 70 is designed to have a flow rate through the purifier 10 of at least about 0.4 liter per hour. In a preferred embodiment, it may be necessary to periodically replenish the amount of nonpurified water 45 in the upper reservoir 40 to maintain a rate of flow of at least about 0.4 liter per hour.

While the water purifier system 70 illustrated in FIG. 5 is shown with one filter 5 and one purifier 10, the invention is not so limited and may utilize as few as one filter 5 or one purifier 10 up to as many filters 5 or purifiers 10 as will fit in the bottom of the upper reservoir 40.

Figure 6:
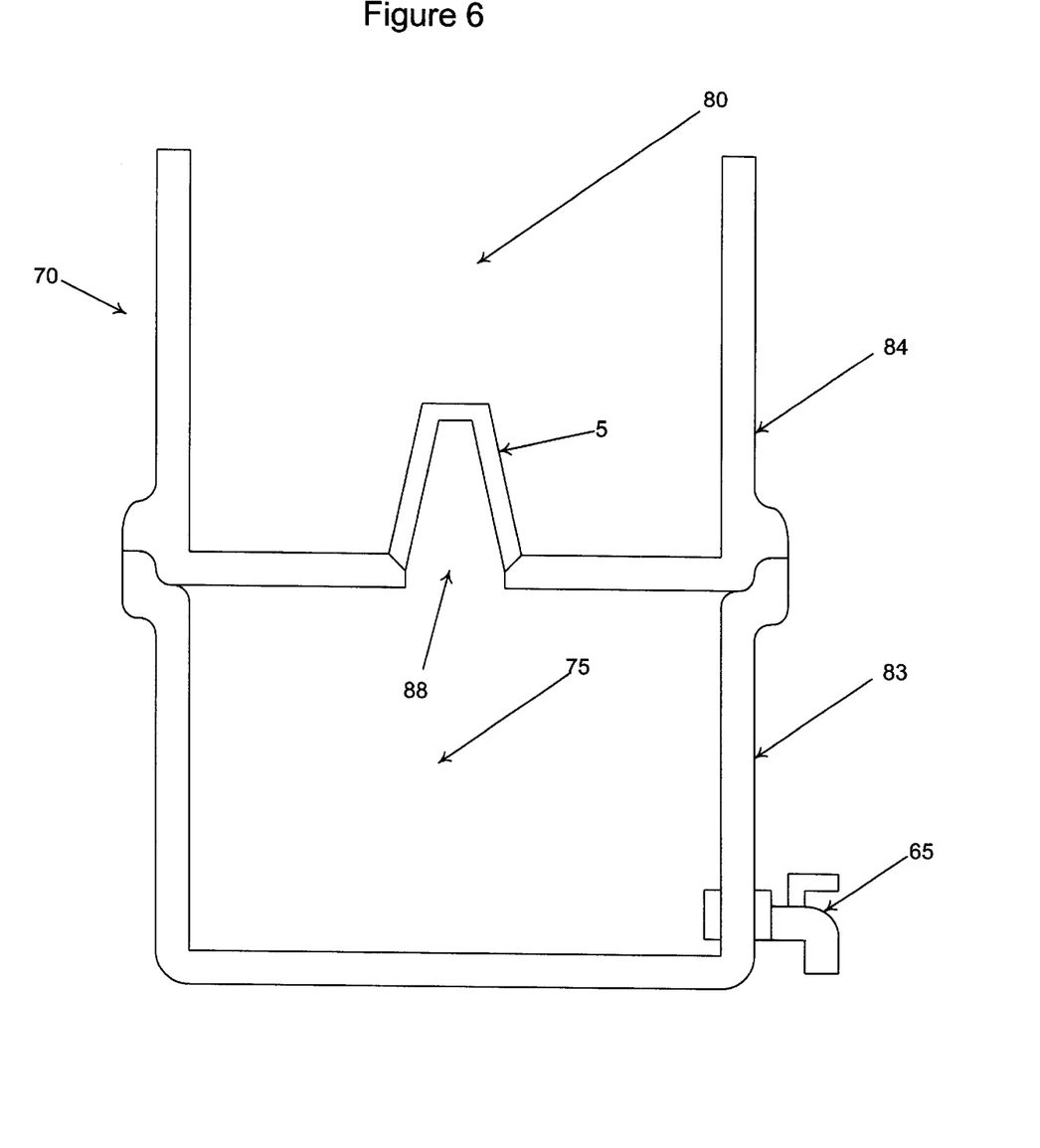
FIG. 6 is a cross-sectional side view of a further exemplary liquid purification system incorporating the liquid purification filter of FIG. 1 and FIG. 2.

FIG. 6 illustrates a cross-sectional side view of the water purification filter 5, illustrated in FIG. 1 and FIG. 2, utilized in a further exemplary water purifier system 70. The water purifier system comprises an upper container 84 which may be removably placed on a lower container 83. The bottom of the upper container 84 has a hole 88 into which fits the water purification filter 5. The filter 5 may be sealed against the bottom of the upper container 84 by any suitable sealing means known in the art. In a preferred embodiment, the filter 5 is sealed against the bottom of the upper container 84 using a small amount of silicone sealant. In another preferred embodiment, the filter 5 is sealed against the bottom of the upper container 84 using a wax sealant. In another preferred embodiment, the filter 5 is sealed against the bottom of the upper container 84 using a gum sealant. The perimeter of the edge of the filter 5 that is in contact with the bottom of the upper container 84 should be sealed so that nonpurified water cannot circumvent the filter 5 and enter at the perimeter of the edge of the filter 5.

Nonpurified water is poured into the upper reservoir 80 of the upper container 84. The nonpurified water permeates through the filter 5 and exits as purified water where it is collected in the lower reservoir 75 of the lower container 83. The purified water may be obtained from the lower reservoir 75 via a pour spout 65 which is connected through the lower container 83. In an embodiment of the water purifier system 70 illustrated in FIG. 6, the upper reservoir 80 may optionally be covered by a lid to protect the nonpurified water in the upper reservoir 80 against evaporation, the elements and debris.

The upper container 84 and the lower container 83 are composed of non-toxic, relatively water impermeable materials. In a preferred embodiment, the upper container 84 and the lower container 83 are composed of earthenware or plastic. The upper container 84 may be composed of the same type of material as the lower container 83. However, the upper container 84 and the lower container 83 do not necessarily have to be comprised of the same type of material. The upper container 84 and the lower container 83 may be of any shape and capacity which provide a flow rate through the filter 5 of at least about 0.4 liter per hour. In a preferred embodiment, the upper container 84 and the lower container 83 are cylindrical in shape. In a preferred embodiment, the capacity of the lower reservoir 75 of the lower container 83 is of sufficient volume to provide storage of an average daily drinking water requirements of a user or users yet not of so large of volume as to create a purified water retention time which would allow re-breeding of bacteria to occur.

Figure 7:
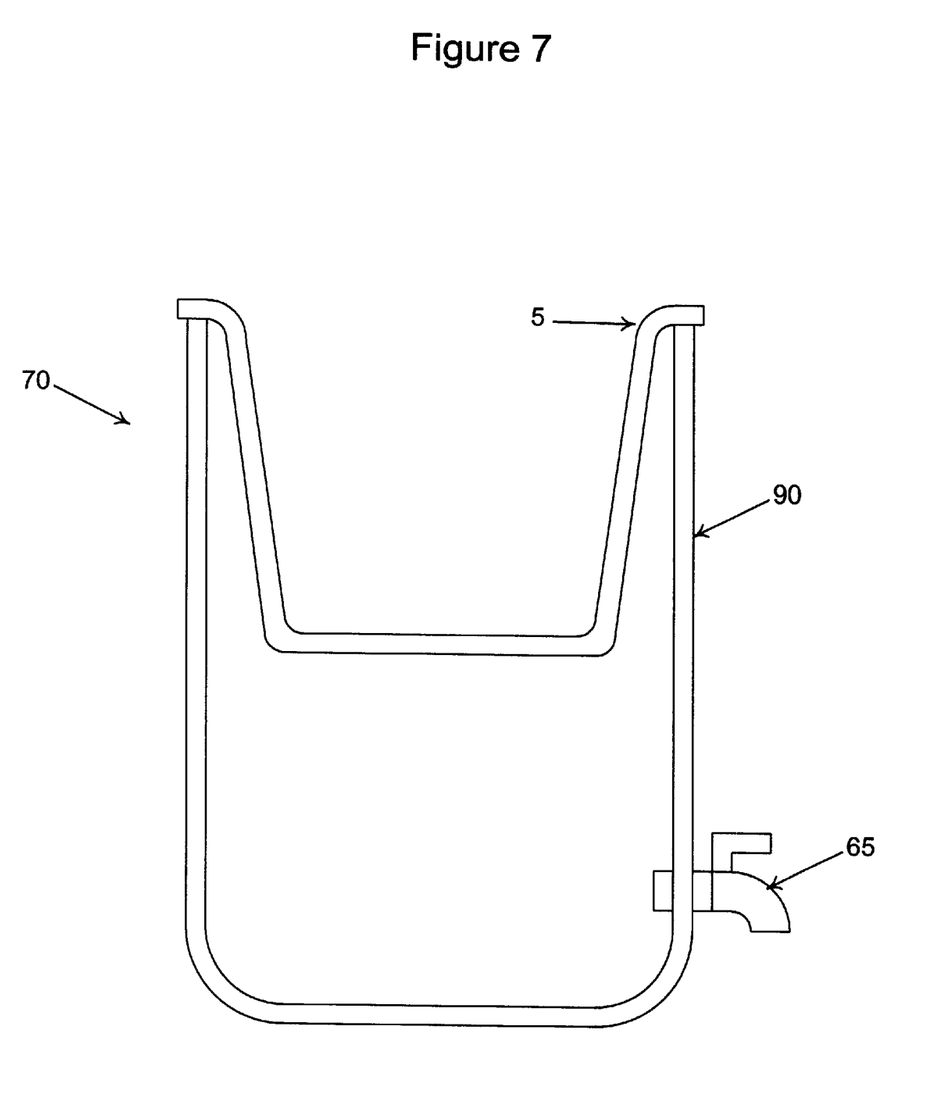
FIG. 7 is a cross-sectional side view of a further exemplary liquid purification system incorporating the porous grog of the present invention.

FIG. 7 illustrates a cross-sectional side view of an alternatively shaped water purification filter 5 utilized in a further preferred embodiment of the water purifier system 70. As illustrated, the filter 5 is removably placed on the reservoir 90. In a preferred embodiment, the filter contains porous grog in an amount between about 40% to about 60%, by weight, of the body composition. Optionally, the filter 5 may be covered with a cap or lid to prevent water contained in the filter 5 from evaporating or becoming further contaminated.

Nonpurified water is poured into the filter 5. The nonpurified water permeates through the filter 5 and exits as purified water which is collected-in the reservoir 90. The purified water may be obtained from the reservoir 90 via a pour spout 65 which is connected through the reservoir 90.

The reservoir 90 is composed of non-toxic, relatively water impermeable materials. In a preferred embodiment, the reservoir 90 is composed of earthenware or plastic.

Figure 8:
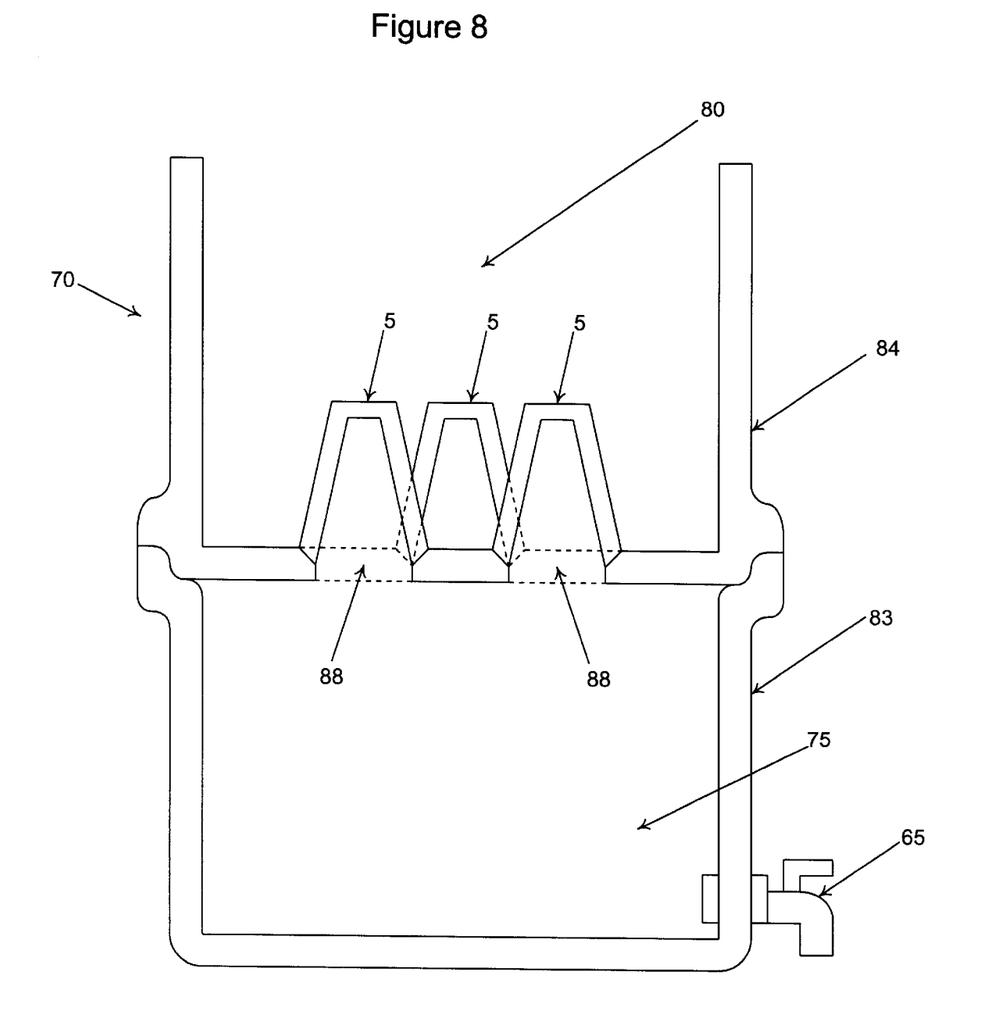
FIG. 8 is a cross-sectional side view of a further exemplary liquid purification system incorporating the liquid purification filter of FIG. 1 and FIG. 2.

FIG. 8 illustrates a cross-sectional side view of several water purification filters 5, illustrated in FIG. 1 and FIG. 2, utilized in a further preferred embodiment of the water purifier system 70. The water purifier system 70 illustrated in FIG. 8 is essentially the same as that shown in FIG. 6 and described above with the exception of the utilization of several filters 5. Where the water flow rate through a single filter 5 is not sufficient to meet the needs of a user or users, the use of multiple filters 5 has an advantage of increasing the water flow rate through the water purifier system 70. While the water purifier system 70 illustrated in FIG. 8 is shown with three filters 5, the invention is not so limited and may utilize as few as one filter 5 up to as many filters 5 as will fit in the bottom of the upper container 84.

Figure 9:
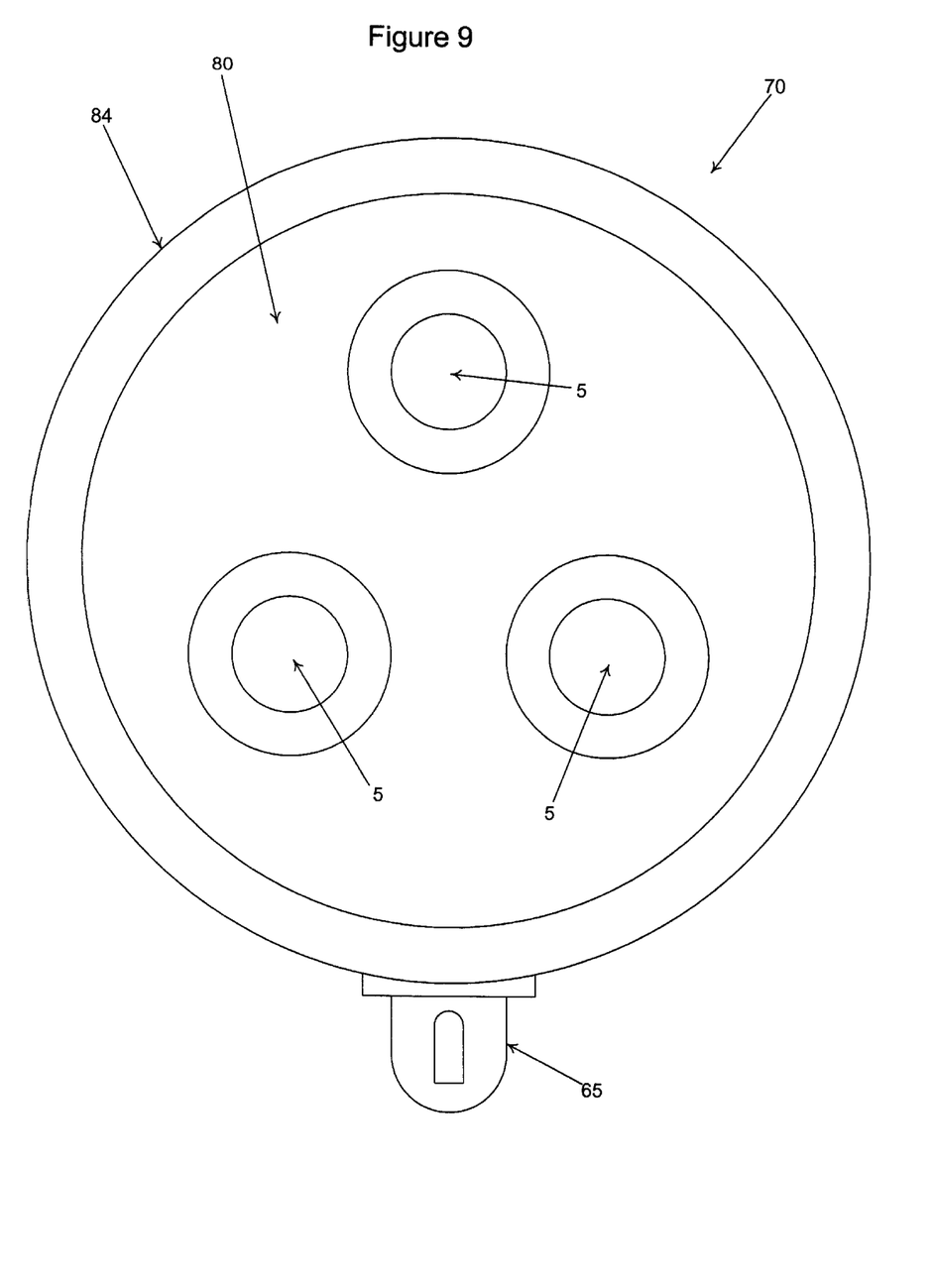
FIG. 9 is a perspective top view of the liquid purification system of FIG. 8.

FIG. 9 illustrates a top perspective view of the water purifier system 70 of FIG. 8. As shown in FIG. 9, the filters 5 are positioned in the bottom of the upper container 84.

Figure 10:
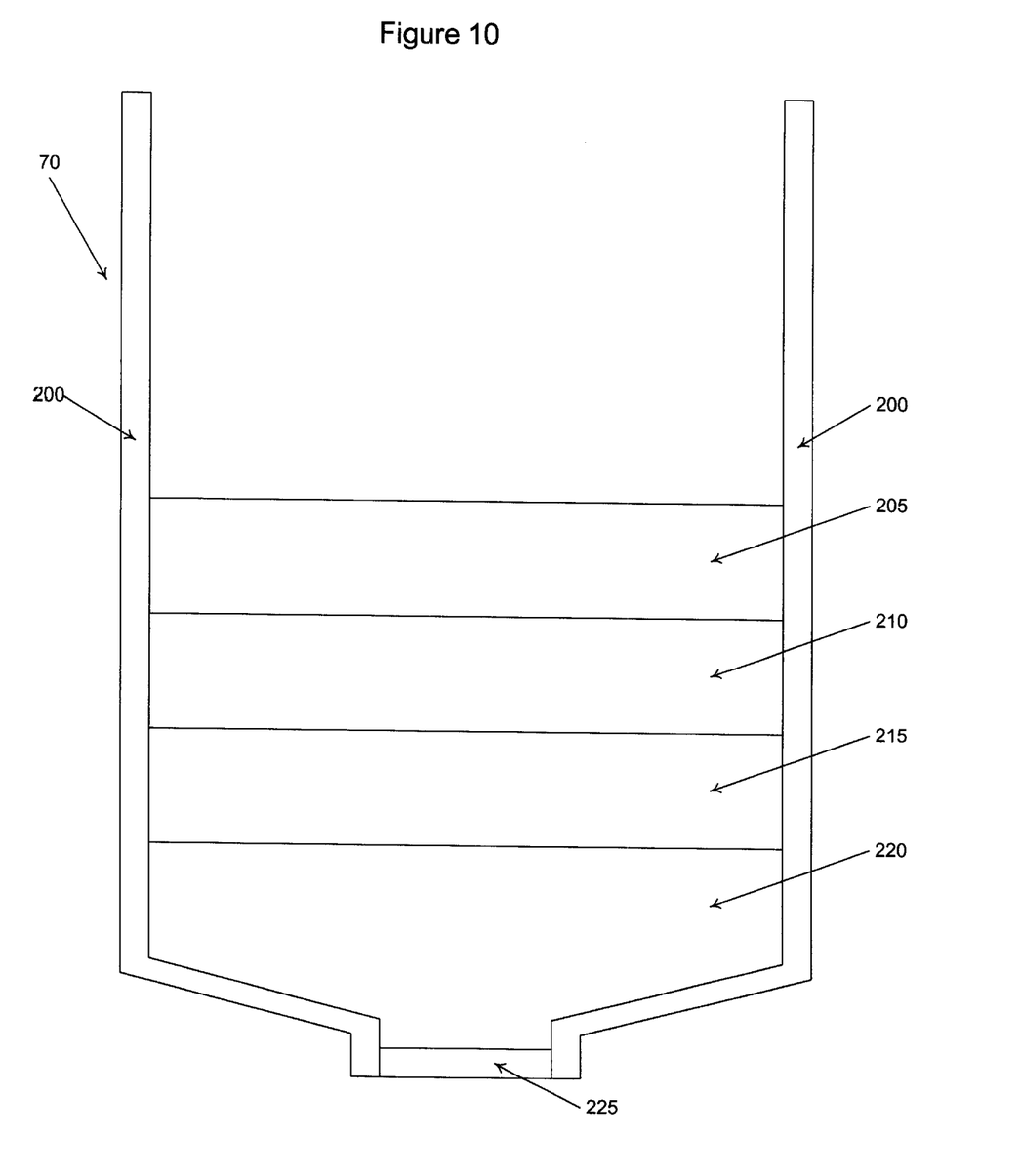
FIG. 10 is a cross-sectional side view of a further exemplary liquid purification system incorporating the porous grog of the present invention.

FIG. 10 illustrates a cross-sectional side view of the porous grog of the present invention utilized in a further exemplary water purifier system 70. As illustrated in FIG. 10, a top layer 205, a first intermediate layer 210, a second intermediate layer 215 and a bottom layer 220 are bounded by a container 200 and a retention cap 225. Optionally, the container 200 may be covered with a cap or lid to prevent the interior of the container 200 from becoming contaminated by foreign particles. Preferably, the container 200 comprises a non-toxic, relatively water impermeable material. In a preferred embodiment, this material is earthenware or plastic.

In a preferred embodiment, the top layer 205 comprises particles of sizes from about 4.0 mm to about 6.0 mm. In a more preferred embodiment, the top layer 205 comprises particles of sizes of about 5.0 mm. Preferably, the particles of the top layer 205 comprise stone, porous grog, or a mixture thereof.

In a preferred embodiment, the first intermediate layer 210 comprises particles of sizes from about 0.5 mm to about 1.5 mm. In a more preferred embodiment, the first intermediate layer 210 comprises particles of sizes of about 1.0 mm.

Preferably, the particles of the first intermediate layer 210 comprise sand, porous grog, or a mixture thereof In a preferred embodiment, the second intermediate layer 215 comprises particles of sizes of about 60 mesh to about 100 mesh. In a more preferred embodiment, the second intermediate layer 215 comprises particles of sizes of about 80 mesh. The particles of the second intermediate layer 215 comprise sand, porous grog, or a mixture thereof. In a preferred embodiment of the present invention, the bottom layer 220 comprises particles of sizes of about 100 mesh to about 140 mesh. In a more preferred embodiment of the present invention, the bottom layer 220 comprises particles of sizes of about 120 mesh. The particles of the bottom layer 220 comprise sand, porous grog, or a mixture thereof.

While the top layer 205, first intermediate layer 210, second intermediate layer 215 and bottom layer 220, as illustrated in FIG. 10, are shown as each having an equal depth, the invention is not so limited. The top layer 205, first intermediate layer 210, second intermediate layer 215 and bottom layer 220 may each independently be of equal or differing depth.

The retention cap 225, as illustrated in FIG. 10, prevents the top layer 205, first intermediate layer 210, second intermediate layer 215 and bottom layer 220 from exiting the container 200 while still allowing liquid to exit from the interior of the container 200. In a preferred embodiment of the present invention, the retention cap 225 comprises a mesh, plastic sieve screen. In a more preferred embodiment, the mesh, plastic sieve screen is from about 100 mesh to about 150 mesh. In another preferred embodiment of the present invention, the retention cap 225 is dry pressed earthenware with a pre-fired body composition comprising clay, porous grog and combustible material. In a preferred embodiment, the body composition contains between about 30% and about 60% by weight of clay, between about 30% and about 60% by weight of porous grog, and between about 5% and about 20% by weight of combustible material. In a more preferred embodiment, the composition contains about 45% by weight of clay, about 45% by weight of porous grog and about 10% by weight of combustible material. In a preferred embodiment, silver is applied to the dry pressed earthenware following firing.

According to the embodiment of the present invention illustrated in FIG. 10, nonpurified water is poured into the top of the container 200. The nonpurified water passes through the top layer 205, the first intermediate layer 210, the second intermediate layer 215, and the bottom layer 220. The water then permeates through the retention cap 225 and exits the water purifier system 70 as purified water.

Figure 11:
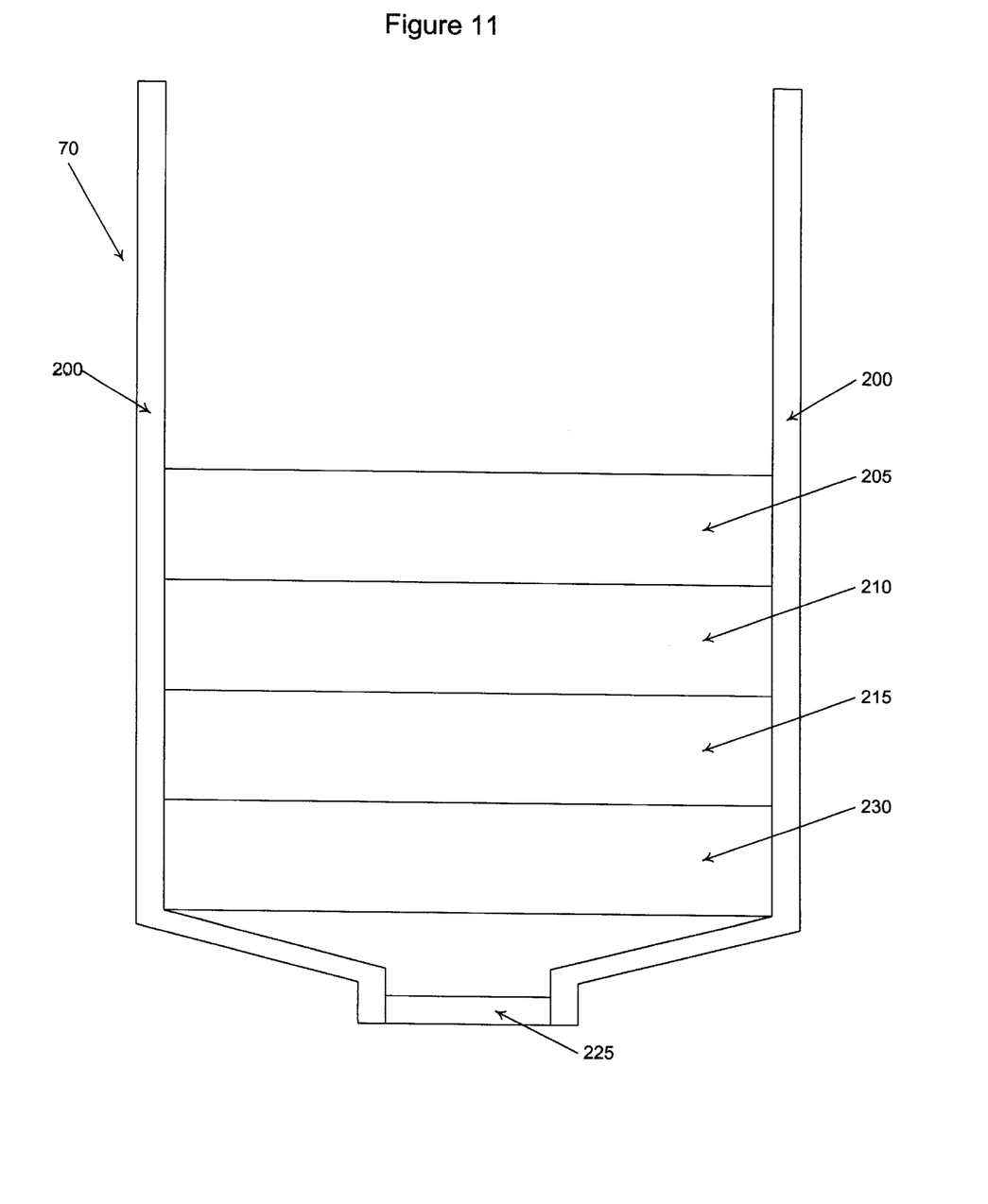
FIG. 11 is a cross-sectional side view of a further exemplary liquid purification system incorporating the porous grog of the present invention.

FIG. 11 illustrates a cross-sectional side view of the porous grog of the present invention utilized in a further exemplary water purifier system 70. As illustrated in FIG. 11, a top layer 205, a first intermediate layer 210, a second intermediate layer 215, and a purifier disk 230 are bounded by a container 200 and a retention cap 225. Optionally, the container 200 may be covered with a cap or lid to prevent the interior of the container 200 from becoming contaminated by foreign particles. Preferably, the container 200 comprises a non-toxic, relatively water impermeable material. In a preferred embodiment, the material is earthenware or plastic.

In a preferred embodiment, the top layer 205 comprises particles of sizes from about 4.0 mm to about 6.0 mm. In a more preferred embodiment, the top layer 205 comprises particles of sizes of about 5.0 mm. Preferably, the particles of the top layer 205 comprise stone, porous grog, or a mixture thereof.

In a preferred embodiment, the first intermediate layer 210 comprises particles of sizes from about 0.5 mm to about 1.5 mm. In a more preferred embodiment, the first intermediate layer 210 comprises particles of sizes of about 1.0 mm. Preferably, the particles of the first intermediate layer 210 comprise sand, porous grog, or a mixture thereof. In a preferred embodiment, the second intermediate layer 215 comprises particles of sizes of about 60 mesh to about 100 mesh. In a more preferred embodiment, the second intermediate layer 215 comprises particles of sizes of about 80 mesh. The particles of the second intermediate layer 215 comprise sand, porous grog, or a mixture thereof.

As illustrated in FIG. 11, a purifier disk 230 is located adjacent to the second intermediate layer 215. The purifier disk 230 comprises dry pressed earthenware with a pre-fired body composition comprising clay, porous grog and combustible material. In a preferred embodiment, the body composition contains between about 30% and about 60% by eight of clay, between about 30% and about 60% by weight of porous grog, and between about 5% and about 20% by weight of combustible material. In a more preferred embodiment, the composition contains about 45% by weight of clay, about 45% by weight of porous grog and about 10% by weight of combustible material. In a preferred embodiment, silver is applied to the purifier disk following firing.

According to the embodiment of the present invention illustrated in FIG. 11, nonpurified water is poured into the top of the container 200. The nonpurified water passes through the top layer 205, the first intermediate layer 210, the second intermediate layer 215, and permeates through the purifier disk 230. The water then permeates through the retention cap 225 and exits the water purifier system 70 as purified water.

Figure 12:
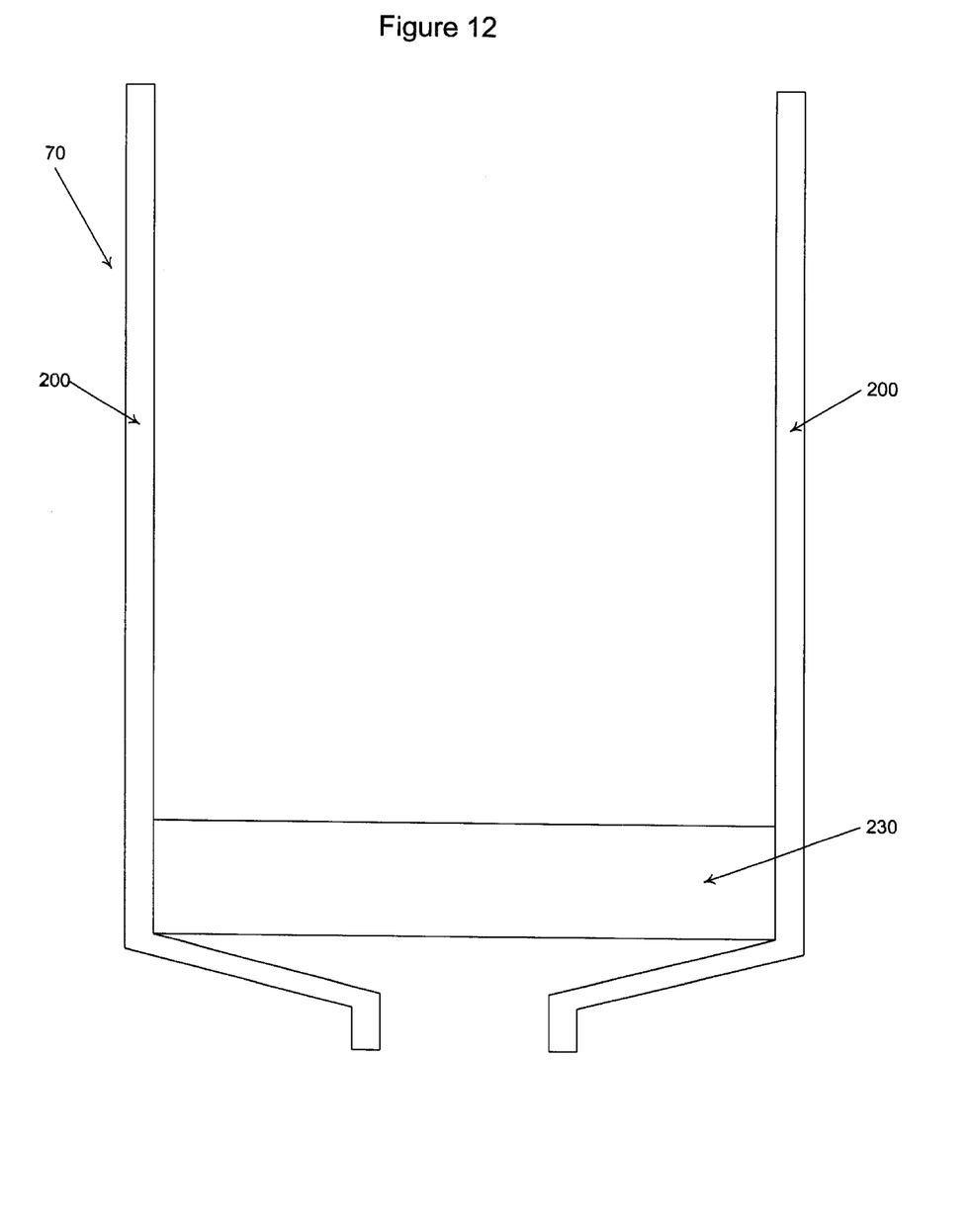
FIG. 12 is a cross-sectional side view of a further exemplary liquid purification system incorporating the porous grog of the present invention.

FIG. 12 illustrates a cross-sectional side view of the porous grog of the present invention utilized in a further exemplary water purifier system 70. As illustrated in FIG. 12, a purifier disk 230 is bounded by a container 200. Optionally, the container 200 may be covered with a cap or lid to prevent the interior of the container 200 from becoming contaminated by foreign particles. Preferably, the container 200 comprises a non-toxic, relatively water impermeable material. In a preferred embodiment, the material is earthenware or plastic.

As illustrated in FIG. 12, a purifier disk 230 is bounded by the container 200. The purifier disk 230 comprises dry pressed earthenware with a pre-fired body composition comprising clay, porous grog and combustible material. In a preferred embodiment, the body composition contains between about 30% and about 60% by weight of clay, between about 30% and about 60% by weight of porous grog, and between about 5% and about 20% by weight of combustible material. In a more preferred embodiment, the composition contains about 45% by weight of clay, about 45% by weight of porous grog and about 10% by weight of combustible material. In a preferred embodiment, silver is applied to the purifier disk following firing.

According to the embodiment of the present invention illustrated in FIG. 12, nonpurified water is poured into the top of the container 200. The nonpurified water permeates through the purifier disk 230 and exits the bottom of the container 200 as purified water.

Although the present invention has been described in terms of particularly preferred embodiments, it is not limited to these embodiments. Alternative embodiments and modifications which would still be encompassed by the invention may be made by those skilled in the art, particularly in light of the foregoing teachings. Therefore, the following claims are intended to cover any alternative embodiments, modifications or equivalents which may be within the spirit and scope of the invention as defined by the claims.

I claim:

1. A porous grog composition comprising a mixture, prior to firing, of water, clay and combustible material, wherein the amount of water is from about 0% to about 40% by weight, wherein the amount of clay is from about 40% to about 80% by weight, wherein the amount of combustible material is from about 20% to about 60% by weight, and wherein said combustible material consists of grain flour.

2. The porous grog composition of claim 1, wherein said clay is clay that fires reddish.

3. The porous grog composition of claim 1, wherein said clay is at least about 10 mesh.

4. The porous grog composition of claim 1, wherein said clay is at least about 30 mesh.

5. The porous grog composition of claim 1, wherein the amount of clay is from about 50% to about 70% by weight, wherein the amount of combustible material is from about 30% to about 50% by weight.

6. The porous grog composition of claim 1, wherein said combustible material is of plant or animal origin.

7. The porous grog composition of claim 1, wherein said grain flour is wheat flour.

8. The porous grog composition of claim 1, wherein said combustible material is from about 100 mesh to about 650 mesh.

9. The porous grog composition of claim 1, wherein said combustible material is from about 250 mesh to about 450 mesh.

10. The porous grog composition of claim 1, wherein said porous grog composition further comprises silver.

11. The porous grog composition of claim 1, wherein silver is applied to said porous grog composition following firing of said porous grog composition.

* * * * *